3,050,476
METHOD OF MAKING A SELF EXTINGUISHING EXPANDABLE POLYMER OF STYRENE BY BROMINATION
John J. Tress, Beaver Falls, Pa., and William J. Heilman, Lubbock, Tex., assignors to Koppers Company, Inc., a corporation of Delaware
No Drawing. Filed Dec. 8, 1958, Ser. No. 778,565
13 Claims. (Cl. 260—2.5)

This invention relates to a method of making self-extinguishing, flame-retardant polymeric materials. In one specific aspect, it relates to a method of brominating vinyl aryl polymers, especially expandable polystyrene or expandable copolymers of styrene which have been rendered capable of expansion, to impart thereto flame-retardant properties. In another aspect, it relates to a method of making a self-extinguishing polymeric foam comprising styrene, having a density of less than about 3 lbs. per cubic foot.

In recent years, workers in the art have strived to produce a polymeric foam that is self-extinguishing or flame-retardant. Success in the preparation of such a foam may well determine the future of foam-core structural materials in the building industry. As a pre-requisite for the use of polymeric foam as insulating material in building construction, certain specifications set up by the Fire Underwriters Laboratories with respect to flame-retardant properties of the foam must be met. Obviously, a highly flammable foam would be unsuitable for construction purposes, since the use of such a foam would exacerbate the ever-present fire hazards in buildings and homes. Polymeric foams are also used to a considerable extent for making decorative and functional objects for home use. From the standpoint of safety it is extremely desirable that such objects be flame-retardant.

By "flame-retardant" we mean that the rate of burning of a particular specimen is considerably slower than the rate of burning of an untreated material. After the flame has been removed from flame-retardant material it will cease to burn, i.e. it is self-extinguishing. Flame retardance of polymeric foam is determined by Standard ASTM Test Method D-635-44.

In the copending application of John J. Killoran et al., S.N. 410,761, there is described a method for making a storable, expandable flame-retardant material, capable of further expansion into an integral cellular polymeric structure, substantially completely coated with a highly halogenated nonvolatile hydrocarbon and antimony oxide. The material has excellent flame-retardant properties, although the method involved in its preparation is somewhat expensive.

Numerous other methods for making flame-retardant polystyrene or polystyrene foam have been suggested by workers in the art. For instance, it has been proposed (German Pat 1,002,125) to add bromine to styrene monomer, or mixtures of polystyrene and styrene monomer, and make a foam from the resulting material. Foam produced by this method has high bulk density, viz: generally greater than about 5 lbs. per cubic foot. This relatively high density adds enormously to the cost of the foam as a construction material. Another process proposed in the literature involves treatment of polyestyrene particles with bromine vapor to produce a flame-retardant material. Equipment costs for vapor phase operation are obviously high and it is difficult to operate such a process on a large scale. There have been attempts involving the use of limited quantities of organic bromides or other additives to enhance the flame-retardant properties of polystyrene and other polymers. Many of these additives are high in cost and difficult to obtain. Moreover, some of these tend to escape from the polymeric material; hence they are not permanent in their flame-retarding effect.

Quite surprisingly, we have found a novel suspension technique for brominating polymeric materials, which have been or are thereafter rendered capable of expansion, to make flame-retardant expandable polymeric material or flame-retardant foam.

It is, therefore, an object of the present invention to provide a novel and economical method for making flame-retardant expandable polymeric particles or flame-retardant polymeric foam.

In accordance with the invention vinyl aryl polymeric particles, such as polystyrene particles or particles of a copolymer of styrene and such monomers as butadiene, alpha-methylstyrene, isobutylene, acrylonitrile, and the like, are added to an aqueous suspension containing bromine. The suspension is heated and the bromine therein is activated to cause it to combine chemically with the polymer particles. The brominated polymer is thereafter washed and dried to produce a flame-retardant polymeric material. A volatile aliphatic hydrocarbon, including chlorinated hydrocarbons, boiling within the range of $-10°$ to $81°$ C., e.g. isopentane, isohexane, n-pentane, neopentane, butane, 2,4-dimethylpentane, petroleum ether, is incorporated into the polystyrene particles before, during, or after the bromination step by conventional means, preferably according to the method described in the copending application of G. F. D'Alelio, S.N. 394,230. Thereafter, the brominated expandable particles may be partially expanded by heating using hot water, steam, infrared or radio frequency means to produce a partially expanded product of low density, capable of further expansion upon heating to form a low density flame-retardant foam. The flame-retardant foam is also produced directly by expanding the expandable brominated material using the means hereinbefore-described.

The preferred polymeric particles used in the present invention are commercially available, spherical or irregularly shaped particles ranging in size of, for example, through 6 mesh to on 60 mesh (U.S. sieves).

Bromination of the polymeric particles is accomplished in aqueous suspension. Up to 9–12 parts by weight polymer particles are used for each 6 parts of water in the suspension without running the risk of agglomeration or settling of the particles. It is convenient to use suspensions comprising about equal parts, i.e. a 1:1 weight ratio of polymer and water. The suspension is stabilized by adding thereto 0.1–5% of a dispersing or stabilizing agent, based upon the total weight of the suspension. Any of the well known organic or inorganic stabilizing agents are suitable for this purpose. Among the organic dispersants alkylaryl sulfonates are quite suitable. Among the inorganic dispersants, zinc oxide, calcium carbonate, bentonite, talc, kaolin, calcium phosphate, aluminum oxide, barium sulfate, magnesium carbonate, and the like, are suitable. Particularly effective are the difficulty soluble phosphates described in U.S. Patent 2,594,913 of J. M. Grim.

Bromine is added to the suspension medium in an amount ranging between 2 and 10%, based upon the weight of the polymeric particles used. If less than 2% by weight bromine is added to the suspension, the resulting product will not be self-extinguishing. The upper limit of bromine concentration is a practical rather than a theoretical one, since it is obviously desirable to operate a process with a minimum consumption of raw materials, provided that an acceptable product is obtained. In the preferred embodiment of our invention, from 2 to 4% by weight bromine is added to the suspension. The bromine may be added to the suspension either as a liquid or as a gas.

It is important for purposes of our novel method to add the bromine to the suspension before the polymer particles are added thereto. If the particles are added to the suspension prior to the bromine addition, it is difficult to achieve intimate and uniform contact between the bromine and the polymer, and the resulting product is non-uniform and not wholly flame-retardant.

In order to accomplish bromination of the particles, the bromine must be made reactive by activating it or by contacting it with an activating agent or a free radical initiator. Uultraviolet light from a commercially available ultraviolet light source, e.g. a 275 watt commercially available General Electric sun lamp can be used as an activating agent for the bromine, although such a technique is not preferred because of the prolonged reaction time required for bromination. In the preferred embodiment of our invention, a free radical type of initiator is added to the system in amounts ranging from 0.1 to 5% by weight, based on the weight of the polymer. Free radical initiators suitable for use in our invention include those which decompose rapidly to produce free radicals within the temperature range required for our bromination technique, viz: at a temperature between about 40 and 120° C. Exemplary free radical initiators and the preferred temperature range for their use include: potassium persulfate (70–100° C.,), benzoyl peroxide (80–95° C.), lauroyl peroxide (60–90° C.), t-butyl perbenzoate (100–115° C.), dicumyl peroxide, bis-p-chlorobenzoyl peroxide (80–95° C.), acetyl peroxide (75–90° C.), bis-2,4-dichlorobenzoyl peroxide (70–85° C.), bis-(1-naphthoyl) peroxide (55–70° C.), cumene hydroperoxide (100–115° C.), 2-azo-bis-isobutylonitrile (70–85° C.), t-butylhydroperoxide (95–110° C.), sodium perborate, sodium carbonate peroxide, di-t-butyl peroxide (110–125° C.), peracetic acid, sodium persulfate, sodium pyrophosphate peroxide. The preferred initiators are potassium persulfate, lauroyl peroxide, and benzoyl peroxide. The preferred concentration of these initiators is from about 0.1 to 2% by weight, based on the weight of polymer.

Although the free radical initiator may be added throughout the course of the reaction, it is preferable, for purposes of insuring intimate contact between the initiator and the bromine, to add the initiator either concurrently with the bromine or at any time before the polymer particles are charged to the suspension system. If this preferred embodiment is used, the reaction time required for bromination is shortened, and the reaction can be more effectively driven to completion.

To eliminate any corrosion problems which may arise because of the presence of free bromine or free HBr in the final product, it is desirable to heat the suspension under reflux conditions to expel residual bromine and HBr from the polymer particles. Alternatively, the free bromine can be neutralized by adding ammonia or aqueous solutions of salts such as sodium nitrite.

We have already mentioned that the temperature required for our novel bromination technique (using a compound capable of forming free radicals) ranges between 40 and 120° C. Below 40° C. there is not sufficient reaction between the bromine and the polymeric particles to result in a final product which is flame-retardant. Above 120° C. there is some danger of particle agglomeration. Furthermore, there is a necessity for resorting to equipment which will withstand very high pressures. Preferred temperatures are between 70 and 100° C.

At the lower temperatures of the present invention, viz: up to about 100° C., bromination is accomplished conveniently at atmospheric pressure. If the reaction temperature selected is increased up to 120° C., the reaction pressure must be correspondingly increased. Pressures up to about 100 p.s.i.g. at the maximum temperature are effective.

The time required for the bromination varies with the reaction temperature and the mode of activation used. An indication of a substantial degree of bromination is obtained when the change in color of the reaction mixture proceeds from orange to pale yellow. At 90° C., using 0.74% lauroyl peroxide, this color change occurs in about 5 minutes. At that same temperature, the color change occurs in 20–30 minutes using 0.45% benzoyl peroxide and 30–40 minutes using 0.50% potassium persulfate. At 75° C., the reaction time with lauroyl peroxide is 45 minutes; with benzoyl peroxide it is 3 hours; and with potassium persulfate it is 2 hours.

If ultraviolet light is used to activate the bromine, much lower temperatures, in the range of 40–60° C., are effective. However, at least about 2.5 to 3 hours are required to complete the bromination reaction.

A volatile aliphatic hydrocarbon boiling in the range of −10 to 81° C., such as petroleum ether, is incorporated into the polymer particles before, during, or after bromination by the general method described in the copending application of D'Alelio, supra. By the D'Alelio method, a stable aqueous suspension is formed containing the polymer particles and the aliphatic hydrocarbon. Intimate contact is maintained between the hydrocarbon and the polymer, thereby incorporating into the particles 4 to 15% by weight of the hydrocarbon, based upon the weight of the particles. The suspensions are stabilized by a stabilizing or suspending agent of the type hereinbefore-described as suitable for preparing the aqueous bromination suspensions. Generally, impregnation of the polymeric particles is accomplished by maintaining the suspension at temperatures between 70 and 120° C. for 1 to 4 hours.

Since the aqueous suspension required for our novel bromination technique is formed in substantially the same manner as the aqueous suspension used for impregnation of polymer particles with the volatile aliphatic hydrocarbon, it is convenient to brominate and impregnate concomitantly. This may be accomplished simply by conducting the bromination in the preferred temperature range, viz: about 70–100° C. and extending the reaction time to about 1 to 4 hours to insure complete impregnation of the brominated polymer particles with the petroleum ether.

After impregnation with the aliphatic hydrocarbon is complete, or alternatively, after bromination is complete, if the polymer was impregnated before the bromination step, the polymer particles are de-watered and washed. Generally, if an organic stabilizing agent is used in the suspension, a water wash is sufficient. If an inorganic dispersant such as calcium phosphate is used, the polymer suspension is adjusted to a pH below about 1.8 by addition of strong concentrated mineral acid, e.g. HCl or $HNO_3$. A water wash is then used to remove free acid from the polymer particles. The particles may also be washed and dried in a similar manner after bromination and thereafter impregnated in aqueous suspension with aliphatic hydrocarbon, washed and dried.

The polymer particles are dried at ambient or at slightly elevated temperatures. The particles may be simply spread on a flat surface and allowed to dry at room temperatures until they are free-flowing. In commercial practice, expandable polymeric particles are placed in a forced circulation oven for from 10 to 20 minutes at about 120–140° F. Drying time and temperature vary with the degree of air circulation achieved in the oven, and the thickness of the particle layer to be dried. Care is taken to avoid any substantial volatilization of the aliphatic hydrocarbon within the particles.

The dried brominated, expandable particles may be heated immediately using conventional means to make a low density foam, i.e. one having a density of less than about 3 lbs./ft., or they may be stored or sold to foam producers. The particles may be partially expanded to produce an integral, free-flowing, low density product from which only a portion of the aliphatic hydrocarbon has been volatilized. Such partially expanded particles are quite suitable for molding purposes. The partial volatilization may be accomplished by heating using steam, hot water, infrared or radio frequency means. A preferred technique for producing low density, partially expanded particles is described in the copending application of W. C. Teach and John J. Tress, S.N. 571,137.

The pre-expanded particles may be stored or sold as such. They are further expanded by the application of heat in the manner hereinbefore described to make an integral, low density, self-extinguishing foam.

Our invention is further illustrated by the following examples:

EXAMPLE I

An aqueous suspension medium was prepared by adding to 900 grams of water, 62.4 grams of tricalcium phosphate and 0.15 gram of Nacconol NRSF, a commercially available surfactant comprising essentially sodium dodecyl benzene sulfonate. Twelve grams of liquid bromine were added to the suspension medium. After two minutes of constant stirring, the bromine was dissolved. A 600 gram quantity of polystyrene particles, which had been pre-impregnated with 7% by weight of petroleum ether (B.P. 35–60° C.) was added to the agitated suspension and allowed to absorb bromine for 10 minutes. Three grams of $K_2S_2O_8$ were then added to initiate the reaction, and the temperature of the reaction medium was raised to 90° C. in a closed system. The reaction was allowed to continue until the reaction medium changed in color from from orange to pale yellow. Total reaction time was about 40 minutes. The reaction medium was adjusted to pH 1 with concentrated HCl, and the particles were thereafter removed and washed with water. They were spread on a flat surface and allowed to dry at room temperature until they became free-flowing.

The expandable polystyrene particles were tested for their flame retardance by the following method. Ten grams of the brominated particles were melted in an aluminum dish for 30 minutes on a hot plate at 266–288° C. The molten polymer was removed from the hot plate and immediately fired with Fisher burner. The top of the burner (with a hot blue flame) was held 1 to 1½ inches above the molten polymer for 15 seconds. The time required for the polymer to extinguish upon removal of the flame was recorded. The self-extinguishing time was 6 seconds. A self-extinguishing time of less than 30 seconds is a measure of good flame retardance.

The remaining expandable polymeric particles were heated in water at 99° C. for 5 minutes and were then molded into self-extinguishing foam blocks via conventional live steam jets at 22 to 25 p.s.i.g. steam pressure. The density of the block (6″ x 6″ x 2″) was 2 lb./ft.³. The foam was cut into 6″ x 1″ x ½″ strips and tested for its flame retardance using ASTM Test Method D–635–44. It was found to be self-extinguishing in 0″, indicating complete flame retardance.

EXAMPLE II

Following the procedure of Example I, numerous tests were made to determine suitable activation agents for the reaction, percent bromine (based upon the weight of the polymer particles required), temperature conditions, and reaction time. The data from these tests are summarized hereunder in Table I.

*Table I*

| Run No. | Polymer [1] | Wt. of Polymer Chgd., g. | Wt. Percent Br. in Suspension, Polymer Basis | Type Initiator | Wt. Initiator, g. | Wt. Percent Initiator, Polymer Basis | Maximum Reaction Temp., °C. | Reaction Time, Hrs. | Particle Test, Self-Extinguishing Time Sec. | Foam Test Self-Extinguishing Distance, inches |
|---|---|---|---|---|---|---|---|---|---|---|
| 1 | Polystyrene | 100 | 0.0 | $K_2S_2O_8$ | 2 | 2 | 90 | 3 | | Completely Consumed. |
| 2 | ----do---- | 750 | 1.0 | $K_2S_2O_8$ | 15 | 2 | 90 | 3.5 | | Do. |
| 3 | ----do---- | 600 | 1.5 | $K_2S_2O_8$ | 2.7 | 0.5 | 90 | 0.5 | 120 | Do. |
| 4 | ----do---- | 600 | 2.0 | Lauroyl Peroxide. | 1.10 | 0.18 | 90 | 4 | 10 | |
| 5 | ----do---- | 60 | 2.0 | Benzoyl Peroxide. | 0.135 | 0.225 | 90 | 4 | 6 | |
| 6 | ----do---- | 600 | 2.0 | ----do---- | 2.7 | 0.45 | 75 | 3 | 15 | |
| 7 | ----do---- | 600 | 2.0 | Lauroyl Peroxide. | 2.22 | 0.375 | 90 | 0.8 | 0 | |
| 8 | Copolymer, 85% Styrene, 15% Alpha-methylstyrene. | 600 | 2.0 | Benzoyl Peroxide. | 2.7 | 0.45 | 90 | 1.5 | 0 | |
| 9 | Polystyrene | 600 | 2.0 | Lauroyl Peroxide. | 4.44 | 0.75 | 75 | 1.5 | 5 | |
| 10 | ----do---- | 750 | 2.0 | $H_2O_2$ | 15 | 2.0 | 50 | 3 | 6 | |
| 11 | ----do---- | 100 | 2.0 | $K_2S_2O_8$ | 2 | 2.0 | 100 | 1 | | 0. |
| 12 | ----do---- | 600 | 2.0 | Sunlamp | | | 55 | 2.5 | 10 | |
| 13 | ----do---- | 60 | 4.0 | Benzoyl Peroxide. | 0.27 | 0.45 | 120 | 1 | 7 | |
| 14 | ----do---- | 60 | 4.0 | ----do---- | 0.3 | 0.5 | 90 | 4 | 8 | |
| 15 | ----do---- | 600 | 4.0 | $K_2S_2O_8$ | 3 | 0.5 | 100 | 1 | | 0. |
| 16 | ----do---- | 60 | 8.0 | Benzoyl Peroxide. | 0.27 | 0.45 | 120 | 1 | 7 | |

[1] Polymer particles contained 7% by weight petroleum ether.

The data of Table I clearly indicate that the impregnation suspensions must contain at least 2% by weight bromine. It is also shown that ultraviolet light and small percentages of a wide variety of free radical initiators are effective over a wide temperature range in activating the bromine.

EXAMPLE III

The procedure of Example I was repeated using 60 grams polystyrene particles containing no aliphatic hydrocarbon. The brominated particles were thereafter suspended in 160 ml. of water containing 18.72 grams tricalcium phosphate, 0.045 gram alkyl aryl sulfonate and 10.5 ml. of petroleum ether (11% by weight-polymer basis). The suspension was maintained at 90° C. for four hours in a closed system. The expandable particles thus produced were heated with steam to form a foam that was self-extinguishing in 0″ by the ASTM test.

EXAMPLE IV

The procedure of Example I was repeated using 600 grams of polystyrene containing no volatile hydrocarbon. Bromination and impregnation were accomplished simultaneously by adding 105 ml. of pentane to the bromination suspension containing the polystyrene particles. The resulting expandable particles were heated in the manner described in Example I to form a flame-retardant foam.

We have thus provided a novel method for making self-extinguishing vinyl aryl polymeric particles. These particles may be expanded to make an integral self-extinguishing foam or they may be partially expanded into free-flowing, low density particles capable of further expansion to form a self-extinguishing foam. Foams made by the method of the present invention have marked utility in the preparation of insulated building panels and decorative articles.

We claim:

1. Method of making a self-extinguishing expandable polymer of styrene, comprising adding particles of said polymer to an aqueous medium at a temperature of 40–120° C., said aqueous medium containing from at least 2% to 10% by weight bromine based upon the quantity of said particles, contacting the bromine in said medium with an activating agent for the bromine at least until the color of said medium changes from orange to a pale yellow, and recovering said polymer from said medium, said polymer having been rendered capable of expansion by the incorporation therein of a volatile aliphatic hydrocarbon boiling in the range of —10 to 81° C.

2. Method of making a self-extinguishing expandable polymer of styrene, comprising adding particles of said polymer to an aqueous medium at a temperature of 40–120° C., said aqueous medium containing from at least 2% to about 10% by weight bromine based upon the quantity of said particles in the presence of an activating agent for the bromination in an amount equal to at least about 0.1% by weight of said polymer at least until the color of said medium changes from orange to a pale yellow, recovering said polymer from said medium, and drying said polymer, said polymer having been rendered capable of expansion by the incorporation therein of a volatile aliphatic hydrocarbon boiling in the range of —10 to 81° C.

3. Method of making self-extinguishing expandable polystyrene comprising adding polystyrene particles in an aqueous medium containing from at least 2% to about 10% by weight bromine based upon the quantity of said particles, adding to said medium an activating agent for the bromination to the extent of at least 0.1% by weight of said polymer, maintaining said medium at a temperature of 70–120° C. at least until the color thereof changes from orange to a pale yellow, recovering said particles from said medium, and including the step of rendering said particles capable of expansion by the incorporation therein of a volatile aliphatic hydrocarbon boiling in the range of —10 to 81° C.

4. Method according to claim 3, wherein said aliphatic hydrocarbon is incorporated within said particles during the bromination step.

5. Method according to claim 3, wherein said aliphatic hydrocarbon is incorporated within said particles after the bromination step.

6. Method of making self-extinguishing, expandable polystyrene comprising incorporating within polystyrene particles a volatile aliphatic hydrocarbon boiling in the range of —10 to 81° C., adding said polystyrene particles to aqueous medium containing at least 2% by weight bromine based upon the quantity of said particles and at least 0.1% by weight based on the weight of said polystyrene of a free radical initiator, heating the reaction medium at a temperature of 70–120° C. at least until the color of said reaction medium changes from orange to a pale yellow, recovering said particles from said reaction medium, and drying said particles.

7. Method of making self-extinguishing expandable polystyrene comprising adding said polystyrene particles at a temperature of 70–120° C. to an aqueous medium containing from about 2 to 10% by weight bromine based upon the quantity of said particles, adding to said medium a free radical initiator decomposing at said temperature, said initiator being present in an amount of at least about 0.1% by weight based on the weight of said polystyrene, maintaining said medium at a temperature of 70 to 120° C. at least until the color thereof changes from orange to a pale yellow, recovering said particles from said medium, washing said particles, and drying said particles, said particles having been rendered capable of expansion by the incorporation therein of 4 to 15% of a petroleum ether boiling in the range of 35–60° C.

8. Method according to claim 7, wherein said initiator is lauroyl peroxide.

9. Method according to claim 7, wherein said initiator is potassium persulfate.

10. Method according to claim 7, wherein said initiator is benzoyl peroxide.

11. Method according to claim 7, wherein said brominated expandable particles are heated to form a self-extinguishing foam having a density of less than about 3 lbs. per cubic foot.

12. Method of making self-extinguishing, expandable polystyrene comprising incorporating by suspending in an aqueous medium within polystyrene particles from 4 to 15% of a volatile aliphatic hydrocarbon boiling in the range of —10 to 81° C., forming a stable, aqueous suspension medium containing from about 2 to 4% by weight bromine based upon the quantity of said particles to be added thereo, adding to said medium said particles and 0.1 to 5% by weight based on the weight of said particles of a free radical initiator decomposing at a temperature of 70–90° C., heating the reaction medium thus formed at a temperature of 70–100° C. at least until the color of said reaction medium changes from orange to a pale yellow, recovering said particles from said reaction medium, washing said particles, and drying said particles.

13. Method according to claim 12, wherein said dried particles are heated to form a self-extinguishing foam having a density of less than about 3 lbs. per cubic foot.

References Cited in the file of this patent

UNITED STATES PATENTS

| 2,442,940 | Staudinger et al. | June 8, 1948 |
| 2,503,252 | Ernsberger | Apr. 11, 1950 |
| 2,744,291 | Stastny et al. | May 8, 1956 |

FOREIGN PATENTS

| 756,654 | Great Britain | Sept. 5, 1956 |
| 778,761 | Great Britain | July 10, 1957 |

UNITED STATES PATENT OFFICE
CERTIFICATE OF CORRECTION

Patent No. 3,050,476                      August 21, 1962

John J. Tress et al.

It is hereby certified that error appears in the above numbered patent requiring correction and that the said Letters Patent should read as corrected below.

Column 7, line 53, after "incorporating" insert -- by suspending in an aqueous medium --.

Signed and sealed this 28th day of January 1964.

(SEAL)                                    EDWIN L. REYNOLDS

Attest:

ERNEST W. SWIDER                 Acting Commissioner of Patents

Attesting Officer